United States Patent [19]

Cho

[11] Patent Number: 5,282,093

[45] Date of Patent: Jan. 25, 1994

[54] COPY TIMING CONTROL CIRCUIT FOR DOUBLE-DECK VIDEO CASSETTE RECORDER

[75] Inventor: Nam Y. Cho, Ahnyang, Rep. of Korea

[73] Assignee: SamSung Electronics Co., Ltd., Suwon, Rep. of Korea

[21] Appl. No.: 723,256

[22] Filed: Jun. 28, 1991

[30] Foreign Application Priority Data

Jul. 7, 1990 [KR] Rep. of Korea ............... 1990-10063

[51] Int. Cl.$^5$ .............................................. G11B 5/86
[52] U.S. Cl. ........................................ 360/15; 369/84
[58] Field of Search ...................... 360/15, 13; 369/84, 369/83; 358/335

[56] References Cited

U.S. PATENT DOCUMENTS

| 4,768,110 | 8/1988 | Dunlap et al. | 360/15 |
| 5,025,324 | 6/1991 | Hashimoto | 360/15 |

FOREIGN PATENT DOCUMENTS

| 2-87349 | 3/1990 | Japan | 360/15 |
| 2-260257 | 10/1990 | Japan | 360/15 |

Primary Examiner—Robert J. Pascal
Assistant Examiner—Tan Dinh
Attorney, Agent, or Firm—Robert E. Bushnell

[57] ABSTRACT

A copy timing control circuit capable of concurrently controlling a copy operation timing of one video deck by application of control signals supplied from a mode switch of the other video deck as well as a timing signal thereof. The copy timing control circuit used in a double-deck video cassette recorder having at least two video cassette decks capable of tape-to-tape copying of video data therebetween, is provided with a mode signal input means for receiving a plurality of mode selection signals produced by application of mode switches in either one of the video cassette decks, a copy signal input means for receiving a copy signal produced by application of a copy key, a microprocessor (15) operably connected to the mode signal input means and the copy signal input means for producing a servo control signal dependent upon receipt of a given state of the mode selection signals and the copy signal, and two servo motor drivers (5,10), connected to receive the servo control signal, for controlling the drive of the respective video cassette deck in response to the servo control signal.

8 Claims, 3 Drawing Sheets

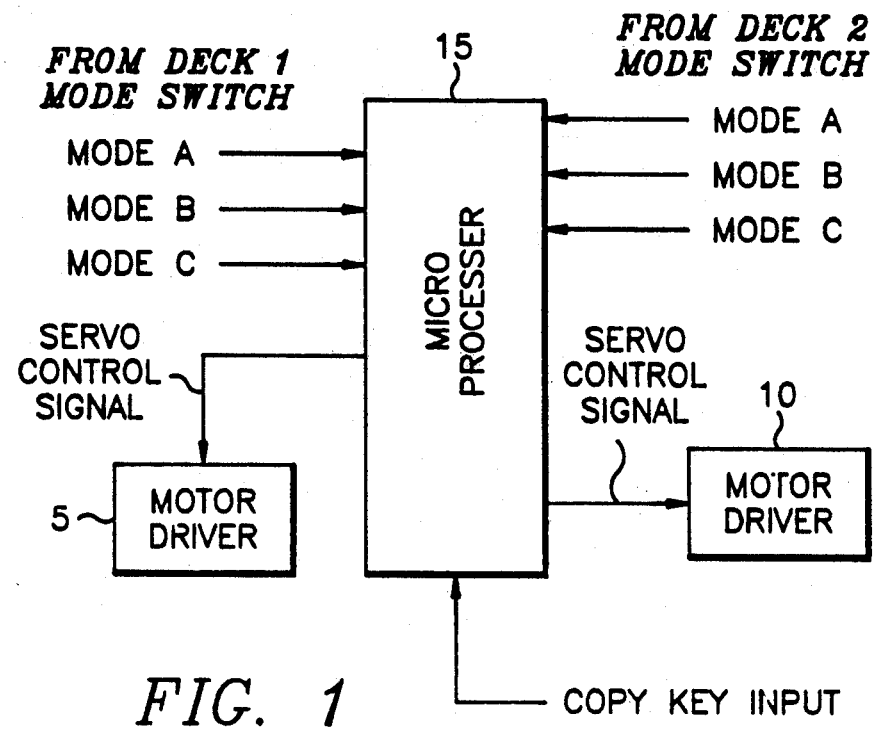
FIG. 1
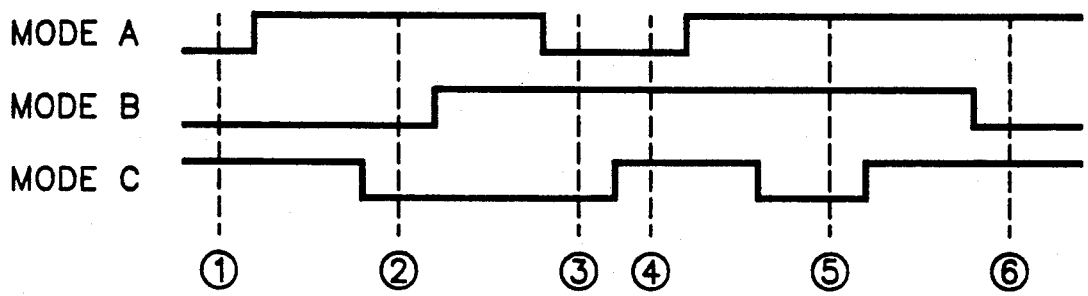
FIG. 2A
| NO | ① | ② | ③ | ④ | ⑤ | ⑥ |
|---|---|---|---|---|---|---|
| MODE | EJECT | FF REW | STOP | RPS JET RPS | REC PAUSE | PLAY REC STILL FPS |
| MODE A | L | H | L | L | H | H |
| MODE B | L | L | H | H | H | L |
| MODE C | H | L | L | H | L | H |
FIG. 2B

COPY TIMING CONTROL CIRCUIT FOR DOUBLE-DECK VIDEO CASSETTE RECORDER

BACKGROUND OF THE INVENTION

The present invention relates to a copy timing control circuit for use in a double-deck video cassette recorder (VCR), particularly to a timing control in a desired operation mode during execution of tape-to-tape copying operation in the VCRs.

In case a tape-to-tape copying operation with a double-deck VCR or two VCRs connected to each other, prior art decks require one deck or one VCR to be set to a playback mode and other deck or VCR to be set to a record mode, when a video signal from the former deck in playback mode is recorded onto the latter deck in record mode. Such prior art however, has a drawback that a precise position control of tape upon copying between both decks or VCRs is hardly provided because of lack of synchronism therebetween. This drawback mostly results in not only waste of tape in using the copy mode, but also occurrence of discontinuity in recording or playback of video signal.

SUMMARY OF THE INVENTION

The present invention generally aims to provide a copy timing control circuit capable of concurrently controlling a copy operation timing of one video deck by application of control signals supplied from a mode switch of the other video deck as well as a timing signal thereof.

According to a preferred embodiment of the present invention, a copy timing control circuit in a double-deck video cassette recorder having at least two video cassette decks capable of tape-to-tape copying of video data therebetween, is provided with a mode signal input means for receiving a plurality of mode selection signals produced by application of mode switches in either one of the video cassette decks, a copy signal input means for receiving a copy signal produced by application of a copy key, a control means operably connected to the mode signal input means and the copy signal input means, for producing a servo control signal dependent upon receipt of a given state of the mode selection signals and said copy signal, and motor driving means, connected to receive the servo control signal, for controlling the drive of the respective video cassette deck in response to the servo control signal.

BRIEF DESCRIPTION OF THE DRAWINGS

A more complete appreciation of the invention, and many of the attendant advantages thereof, will be readily enjoyed as the same becomes better understood by reference to the following detailed description when considered in conjunction with the accompanying drawings in which like members indicate the same or similar components, wherein:

FIG. 1 shows a block diagram of a preferred embodiment according to the present invention;

FIGS. 2A and 2B respectively show by way of example input signals at respective mode switches A, B and C, and a schematic diagram, similar to a truth table, defining the various operation modes of a video cassette deck with respect to the input signals at the mode switches.

DETAILED DESCRIPTION OF THE INVENTION

Referring to FIG. 1, a preferred embodiment of a copy timing control circuit according to the present invention is disclosed. The circuit is used in a double-deck video cassette recorder having at least two video cassette decks capable of tape-to-tape copying of video data therebetween, wherein the circuit includes a mode signal input device for receiving a plurality of mode selection signals produced by application of mode switches in either one of the video cassette decks. The circuit further includes a copy signal input device for receiving a copy signal produced by application of a copy key, and a microprocessor 15 operably connected to the mode signal input device and the copy signal input device, for producing a servo control signal dependent upon receipt of a given state of the mode selection signals and the copy signal. The circuit further includes two servo motor driver 5 and 10, connected to receive the servo control signal, for controlling the drive of the respective video cassette deck in response to the servo control signal.

A mode selection logic signal as shown in FIG. 2A, generated by the mode switch input according to operation modes of the deck, is applied to the microprocessor 15, which operation modes are shown in the diagram of FIG. 2B. For example, if the mode switches A and B are at logic low state, while the mode switch C is at logic high state, then "EJECT" mode is selected. Likewise, if the mode switches A and C are at logic high state, while the mode switch B is at logic low state, then "PLAY", or "RECORD" mode is operated. Therefore, in order that the operation mode of deck is change from "EJECT" mode to "RECORD" or "PLAYBACK" mode, the input signals from the mode switches A, B and C, as shown in the diagram of FIG. 2B, are applied to the microprocessor 15. Thereafter, the microprocessor checks whether to receive a copy key input, and when a desired mode selection signal is received from the mode switches in one cassette deck, generates a servo motor control signal to enable operation of the other deck in response to the key input.

Here, the following five occasions are assumed as regards the respective output state of the servo control signal:

(1) when one deck is in STOP mode, the other deck is operated into RECORD mode;
(2) when one deck is in PLAY mode, the other deck is operated into RECORD mode;
(3) when one deck is in RECORD & PAUSE mode, the other deck is operated into PLAY mode;
(4) when one deck is just in REWIND PICTURE SEARCH (RPS) or RECORD & PAUSE mode, the other deck is driven; and
(5) after one deck is in RECORD & PAUSE mode and the other deck is in PLAY or STILL mode, both decks are operated in record modes and playback, respectively.

Figure 3:
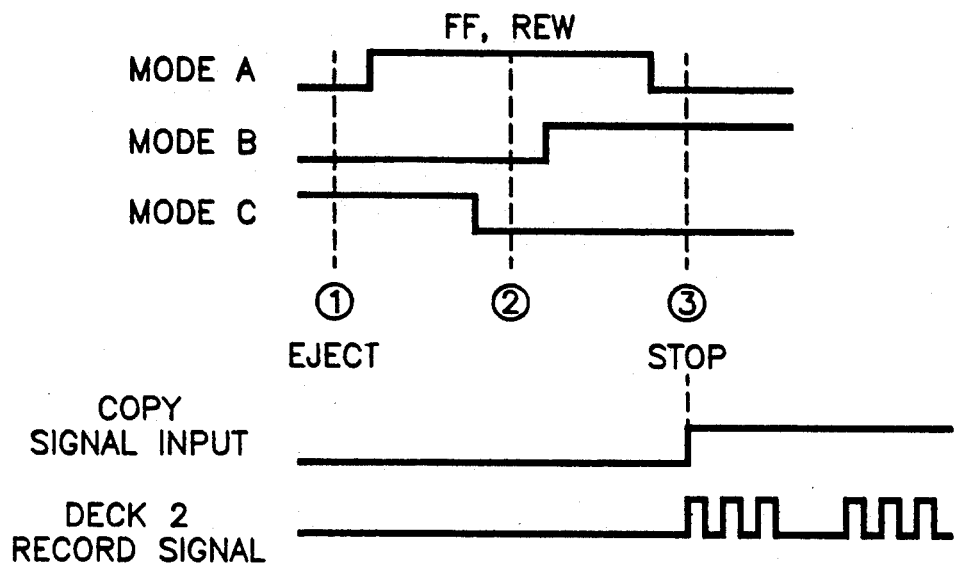
FIGS. 3 through 6 are various waveform diagrams to explain a part of the operation according to the present invention.
Figure 4:
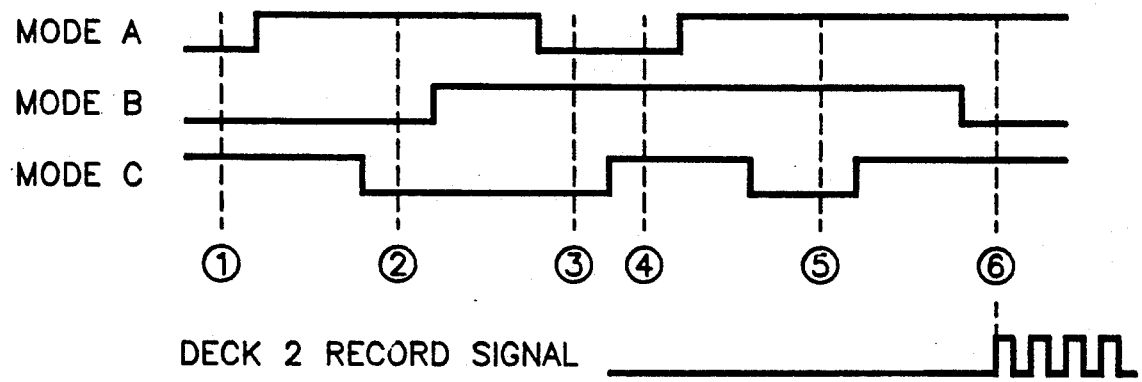
Figure 5:
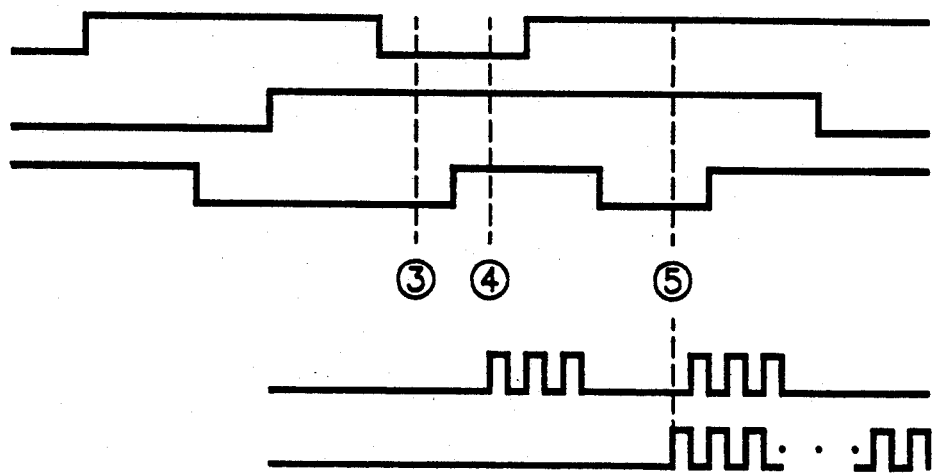
Figure 6:
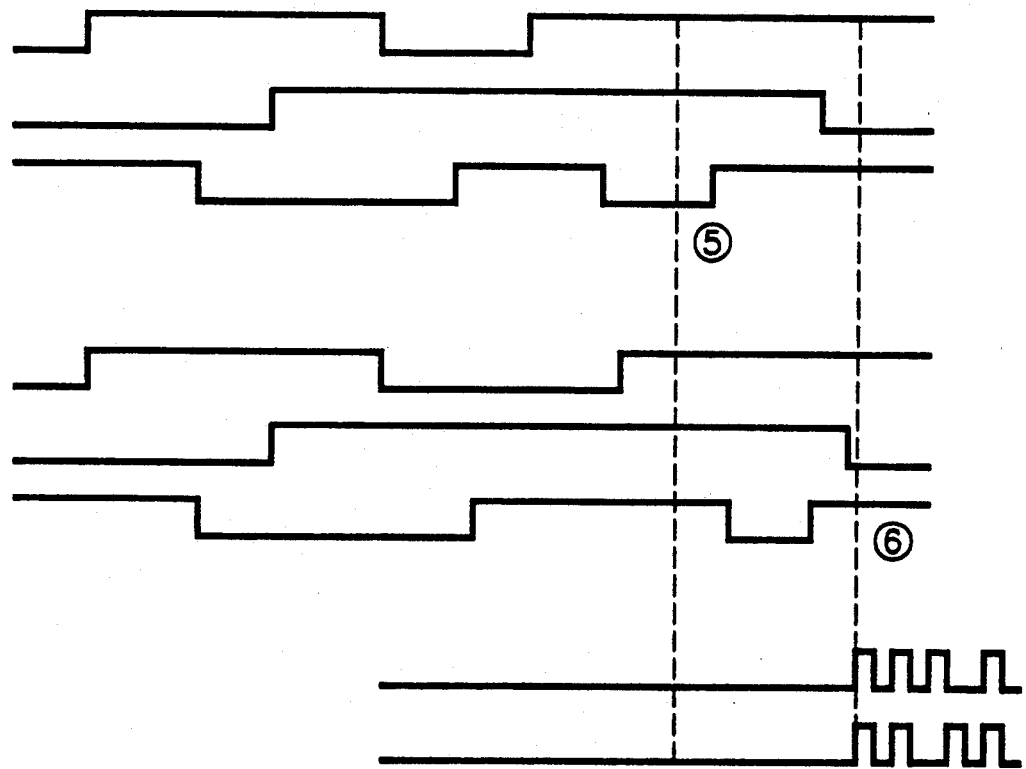

To describe the above occasion (1) with reference to FIG. 3, when a first deck is in STOP mode, the mode switches A and C are at logic low and the mode switch B is at logic high, when a copy key input is received to the microprocessor and thereafter a video record signal of a second deck is outputted. Hence, it is possible to place the second deck in RECORD mode while placing the first deck in STOP mode. In the second occasion (2) mentioned above, when the first deck is in PLAY mode, the mode switches A and C, as shown in FIG. 4, is at logic high state and the mode switch B is at logic low state, by checking which mode signals the video record signal of the second deck is outputted. Further, in the occasions (3) and (4), as shown in FIG. 5, when inputs of the mode switches A, B and C of the first deck are received as desired, a record drive signal of the second deck is provided. Furthermore, in the occasion (5), as shown in FIG. 6, when the inputs of the mode switch A, B and C in the first deck are applied into a RECORD PAUSE mode and the inputs of the mode switches A, B and C in the second deck are applied into PLAY or STILL mode, then the first deck provides a record signal and the second deck provides a playback signal, thereby enabling a copying operation in the double-deck VCR.

As is understood in the foregoing description, the copy timing control circuit according to the present invention may be used to prevent the waste of video tape and further to enable the correct tape positioning upon tape-to-tape copying mode. Further, this and other advantages of the invention can be achieved by checking mode switch inputs in one cassette deck and, when a desired mode switch input is received, enabling drive of the other cassette deck to record the video signal from the one cassette deck. That is, synchronism between both decks are effectively obtained.

What is claimed is:

1. A copy timing control circuit for a double-deck video cassette recorder having at least two video cassette decks capable of tape-to-tape copying, said circuit comprising:
   mode signal input means for generating first and second mode selection signals indicative of user selected operational modes of a first video cassette deck and a second video cassette deck, respectively;
   copy signal input means for generating a copy signal indicative of user selection of a copy mode;
   control means operably connected to said mode signal input means and said copy signal input means, for producing servo control signals to enable a playback mode of said second video cassette deck and to enable a record mode of said first video cassette deck in response to receipt of said copy signal when said first mode selection signals are indicative of a record pause mode of said first video cassette deck and said second mode selection signals are indicative of one of a playback mode and a still mode of said second video cassette deck, and for producing said servo control signals to enable a record mode of said second video cassette deck in response to receipt of said copy signal when said first mode selection signals are indicative of a stop mode of said first video cassette deck;
   first motor driving means, connected to receive said servo control signals, for controlling driving of said first video cassette deck in response to said servo control signals; and
   second motor driving means, connected to receive said servo control signals, for controlling driving of said second video cassette deck in response to said servo control signals.

2. A circuit as claimed in claim 1, further comprised of said control means producing said servo control signals to enable said record mode of said second video cassette deck in response to receipt of said copy signal when said first mode selection signals are indicative of a playback mode of said first video cassette deck.

3. A circuit as claimed in claim 1, further comprised of said control means producing said servo control signals to enable said playback mode of said second video cassette deck in response to receipt of said copy signal when said first mode selection signals are indicative of said record pause mode of said first video cassette deck.

4. A circuit as claimed in claim 1, further comprised of said control means for producing said servo control signals to enable said record mode of said second video cassette deck in response to receipt of said copy signal when said first mode selection signals are indicative of one of a rewind picture search mode and said record pause mode of said first video cassette deck.

5. A circuit as claimed in claim 2, further comprised of said control means producing said servo control signals to enable said record mode of said second video cassette deck in response to receipt of said copy signal when said first mode selection signals are indicative of a playback mode of said first video cassette deck.

6. A circuit as claimed in claim 5, further comprised of said control means producing said servo control signals to enable said playback mode of said second video cassette deck in response to receipt of said copy signal when said first mode selection signals are indicative of said record pause mode of said first video cassette deck.

7. A circuit as claimed in claim 6, further comprised of said control means for producing said servo control signals to enable said record mode of said second video cassette deck in response to receipt of said copy signal when said first mode selection signals are indicative of one of a rewind picture search mode and said record pause mode of said first video cassette deck.

8. A method for controlling a first video cassette deck and a second video cassette deck with common control processor, said method comprising:
   enabling a record mode of said first video cassette deck and enabling a playback mode of said second video cassette deck in response to receipt of a user generated copy signal when said first video cassette deck is in a record pause mode and said second video cassette deck is in one of a playback mode and a still mode;
   enabling a record mode of said second video cassette deck in response to receipt of said copy signal when said first video cassette deck is in a stop mode;
   enabling said record mode of said second cassette deck in response to receipt of said copy signal when said first video cassette deck is in said playback mode;
   enabling said playback mode of said second video cassette deck in response to receipt of said copy signal when said first video cassette deck is in a record pause mode; and
   enabling said record mode of said second video cassette deck in response to receipt of said copy signal when said first video cassette deck is in one of a rewind picture search mode and said record pause mode.

* * * * *

UNITED STATES PATENT AND TRADEMARK OFFICE
CERTIFICATE OF CORRECTION

PATENT NO. : 5,282,093
DATED : January 25, 1994
INVENTOR(S) : Nam-Young Cho

It is certified that error appears in the above-indentified patent and that said Letters Patent is hereby corrected as shown below:

On the Title Page:

Inventor, [75], Change "Nam Y. Cho" to --Nam-Young Cho-- .

Column 1, Line 47, Change "said" to --the-- .

Signed and Sealed this

Fourth Day of October, 1994

Attest:

BRUCE LEHMAN

*Attesting Officer*      *Commissioner of Patents and Trademarks*